(12) United States Patent
Landry et al.

(10) Patent No.: US 8,044,119 B2
(45) Date of Patent: Oct. 25, 2011

(54) INSULATING MATERIAL OF EPOXY COMPOUND, ACRYLIC RESIN, CERAMIC PARTICLES AND CURING AGENT

(75) Inventors: James E. Landry, Lafayette, LA (US);
Barry E. Burke, Spring, TX (US)

(73) Assignee: James E. Landry, Lafayette, LA (US)

( * ) Notice: Subject to any disclaimer, the term of this patent is extended or adjusted under 35 U.S.C. 154(b) by 0 days.

(21) Appl. No.: 09/413,993

(22) Filed: Oct. 7, 1999

(65) Prior Publication Data
US 2002/0017016 A1 Feb. 14, 2002

(51) Int. Cl.
*B32B 27/30* (2006.01)
*B32B 27/34* (2006.01)
*B32B 27/38* (2006.01)
*C08K 3/36* (2006.01)
*C08K 7/14* (2006.01)
*C08K 7/24* (2006.01)
*C08L 63/02* (2006.01)
*C08L 63/10* (2006.01)

(52) U.S. Cl. ........ 523/428; 428/414; 523/450; 523/458; 523/466; 523/467

(58) Field of Classification Search .................. 29/460, 29/527.2; 72/183, 9.4, 11.1; 427/178, 318, 427/327, 388.1, 434.2, 435, 543; 118/DIG. 11, 118/DIG. 12, DIG. 13; 264/145, 146, 165, 264/280, 294, 328.11, 574; 425/116; 249/90
See application file for complete search history.

(56) References Cited

U.S. PATENT DOCUMENTS

| | | | | | |
|---|---|---|---|---|---|
| 3,155,545 | A | * | 11/1964 | Rocks et al. | 118/621 |
| 3,965,551 | A | * | 6/1976 | Ostrowski | 29/33 D |
| 4,182,782 | A | * | 1/1980 | Scheiber | 427/195 |
| 4,345,363 | A | * | 8/1982 | Leuchs et al. | 29/527.4 |
| 4,355,526 | A | * | 10/1982 | Miles | 72/164 |
| 4,367,318 | A | * | 1/1983 | Ishimura et al. | 525/481 |
| 4,621,399 | A | * | 11/1986 | Qureshi et al. | 29/33 D |
| 4,673,697 | A | * | 6/1987 | Rowley | 523/218 |
| 4,721,410 | A | * | 1/1988 | Recalde | 405/166 |
| 5,229,252 | A | * | 7/1993 | Flynn et al. | 430/280.1 |
| 5,676,009 | A | * | 10/1997 | Bright et al. | 72/161 |
| 5,863,332 | A | * | 1/1999 | Foster et al. | 118/314 |
| 6,046,072 | A | * | 4/2000 | Matsuura et al. | 438/118 |
| 6,058,979 | A | * | 5/2000 | Watkins | 138/149 |
| 6,079,452 | A | * | 6/2000 | Touzel et al. | 138/149 |
| 6,127,508 | A | * | 10/2000 | Corley et al. | 528/111.3 |
| 6,153,270 | A | * | 11/2000 | Russmann et al. | 427/522 |
| 6,160,041 | A | * | 12/2000 | Neuner | 523/440 |
| 6,203,647 | B1 | * | 3/2001 | Schuler et al. | 156/171 |
| 6,213,157 | B1 | * | 4/2001 | Thiebaud et al. | 138/149 |
| 6,214,460 | B1 | * | 4/2001 | Bluem et al. | 428/355 AC |
| 6,274,939 | B1 | * | 8/2001 | Wolf | 257/796 |
| 6,395,845 | B1 | * | 5/2002 | Weinmann et al. | 525/523 |
| 6,956,079 | B2 | * | 10/2005 | Scarlette | 524/430 |

OTHER PUBLICATIONS

CAS registry No. 82029-76-3 for Epon 8132 bisphenol A diglycidyl ether with 20 wt% C12-C13 alkyl glycidyl ether reactive diluent, 1967, one page.*
CAS registry No. 185228-02-8 for Epon 8161 polyacrylate epoxy resin, 1967, one page.*
Hexion technical data sheet for Epon 8132, Oct. 2004, three pages.*
Hexion technical data sheet for Epon 8161, Sep. 2005, three pages.*
CAS registry No. 397869-43-1 for Epicure 3164 polyamide curing agent for epoxy resins, 1967, one page.*
CAS registry No. 9046-10-0 for Jeffamine D 230 polyoxypropylene diamine, 1967, two page.*
CAS registry No. 134633-08-2 for Byk 362 acrylate copolymer, 1967, one page.*
CAS registry No. 169313-57-9 for Heloxy 9 C12-C13 alkyl glycidyl ether, 1967, one page.*
CAS registry No. 1314-23-4 for Zirox 180 zirconium oxide, 1967, two pages.*
CAS registry No. 308066-94-6 for Cenospheres glass microspheres, 1967, one page.*
CAS registry No. 138184-94-8 for Cab-O-Sil TS 720 polymethylsilylated fumed silica, 1967, one page.*

* cited by examiner

*Primary Examiner* — Robert Sellers
(74) *Attorney, Agent, or Firm* — Buchanan Ingersoll & Rooney PC

(57) ABSTRACT

An insulating material and the method of applying the insulating material to products and systems. The material, method and system may be applied to tubulars used in deep water projects. The insulating material is composed of ceramic particles, epoxy and an acrylate monomer that is a precurser to an acrylic resin, and additives. Equal volumes of a epoxy component mixtures and a curing agent component mixture when heated and mixed together create a liquid insulating material that can be applied to the outer surface of pipe involving a repetitive series of steps controlled by an operator at a main control panel. Pipe unrolled from a pipe reel is straightened and heated. In a heated retort, liquid insulating material is applied to the surface of pipe and cured to the final insulation coating. The final coated pipe can be replaced on the reel for shipment to the job site. Within the deep sea environment the hardness of the insulating material can withstand the compressive pressure, water absorption and corrosion; and the insulating properties avoid the affects of near-freezing water temperatures. A curing agent in the formulation provides flexibility to the insulation. In the underwater environment, current movements can damage and breech the connections of the systems. Flexibility in the insulation will protect the systems from the currents and ensure integrity of the systems especially critical in piping systems.

16 Claims, 2 Drawing Sheets

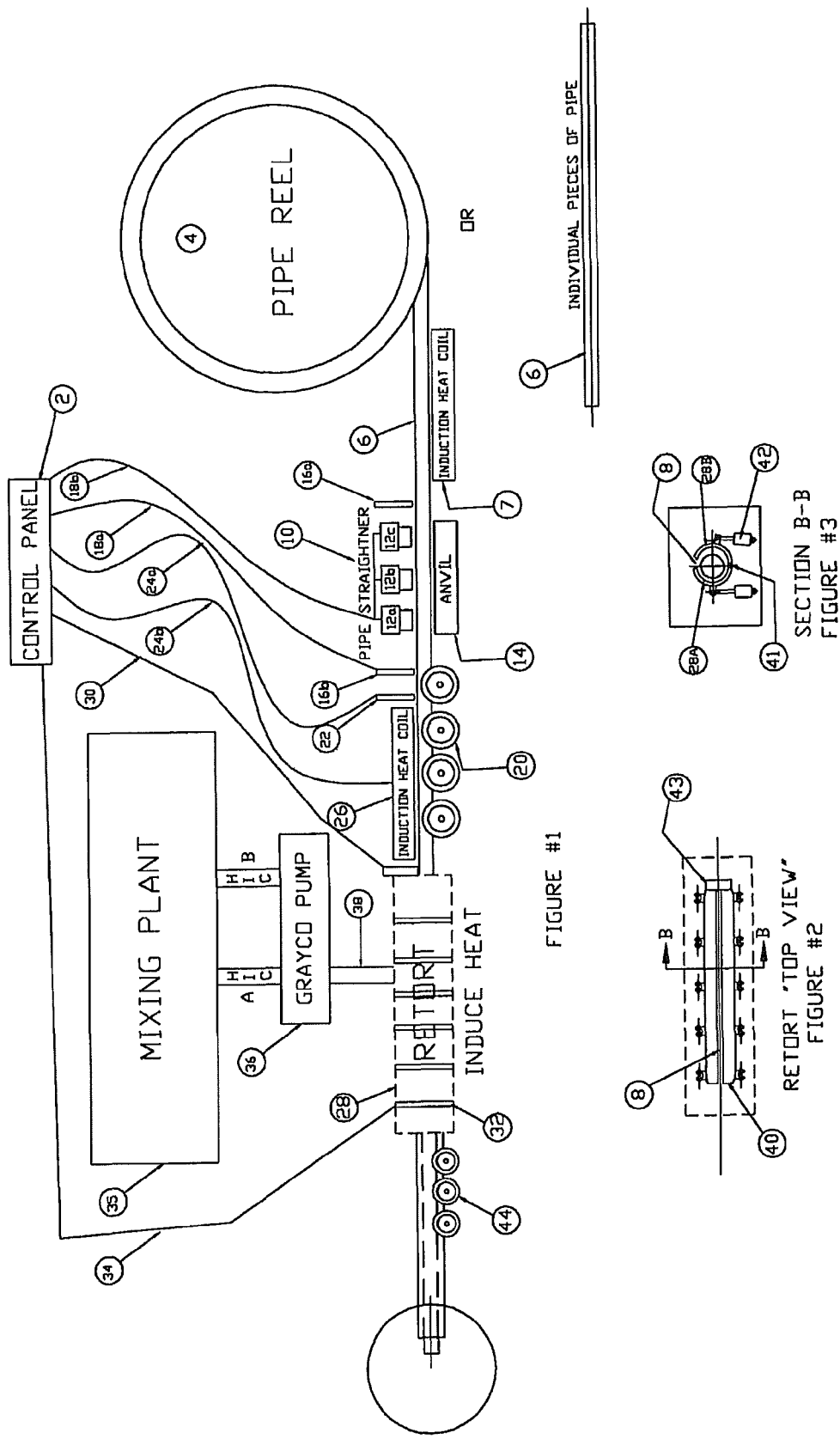

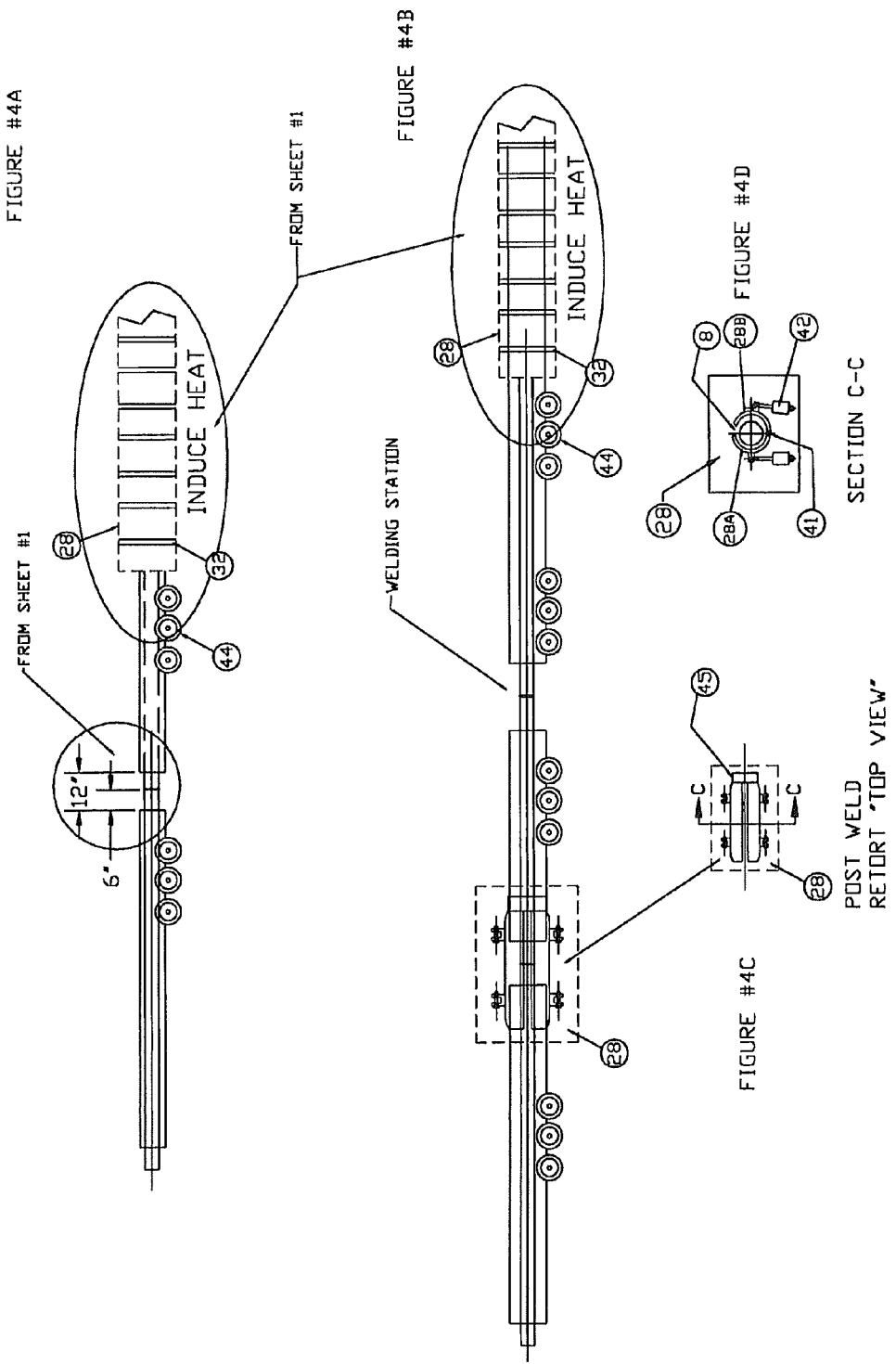

INSULATING MATERIAL OF EPOXY COMPOUND, ACRYLIC RESIN, CERAMIC PARTICLES AND CURING AGENT

BACKGROUND OF THE INVENTION

This invention relates to an insulating material. More particularly, but not by way of limitation, this invention relates to an insulated material and a method of applying the insulated material to goods and industrial products such as tubular members. In the most preferred embodiment, a flexible insulating material for underwater systems and a method of use is disclosed.

Global energy demands have provided the impetus and engineering advances to drill into underwater oil and gas reservoirs so that today a significant portion of the world's oil is supplied by offshore drilling off the coasts of the United States, Europe, Russia and Brazil. Oil and gas exploration and production in underwater environments presents challenges not encountered in onshore industry. The underwater environment exposes equipment to compressive forces, near-freezing water temperatures, water absorption, salt water corrosion, undersea currents and marine life. An insulating material to counter the effects of these harsh conditions would allow already established systems used in onshore applications to be used in underwater systems with little or no alteration to the systems. The insulating material would need to possess a unique set of characteristics not present in insulating materials currently in use.

In recent years, technology has begun to catch up with the ever growing interests in the deep water development. Newer and more economical designs in oil and gas production equipment and processes has finally opened the deep water development to many oil and gas exploration companies. However, there are still many more problems and expenses that exists at water depths of 2,000 feet (600 meters) and beyond.

Some of the most costly problems are the formation of paraffins in crude oil and hydrates in natural gas at these deep water depths. Hydrocarbons (paraffins and hydrates) that are brought from deep within the earth are very hot when they reach the sub-sea wellhead, somewhere between 150° F. to 190° F. (66°-88° C.), but rapidly cool due to seawater surrounding the steel piping system as it is flowing up to the surface. These impurities, paraffins and hydrates, remain in solution as long as the fluid stream remains hot enough to flow. When the stream starts to cool off or slow down the impurities begin to solidify and constrict then block the internal diameter of the piping system, slowing flow then eventually total blockage of the flow. To clear the constriction and the blockage, expensive restoration technology is required such as chemically unstopping the piping system. This restoration causes much unscheduled production down-time and in extreme cases total abandonment of the well site. These unscheduled restorations become a greater and more prevalent problem as companies explore deeper depths and produce longer piping systems.

Recently, oil and gas exploration companies have tried to develop many fixes to remedy the expenses associated with the formation of hydrates at deeper water depths. Again, improved designs in the oil and gas production equipment are just some of the answers to economically producing oil and gas at the greater water depths. One of the remedies of reducing the formation of paraffins and hydrates is insulating the wellhead and piping systems from the 40° F. (4° C.) seawater environment. Most of the recent attempts to insulate the wellhead and piping systems used a product known as "Syntactic Foam", that was previously and mostly used for buoyancy applications. The syntactic foam does have good thermal insulation properties but economic success has been limited due to cost and significant application problems such as production problems in application. The syntactic foam has minimal flexibility characteristics which is a deterrent to the contraction and expansion that takes place during production and installation. Since prior art syntactic foam is so brittle, it limits the economic life requirements at these depths. In addition, great care is needed when deploying large assemblies due to the inability to flex when moving the equipment to the offshore location.

The novel compound, method application and system was developed due to the ever growing need for a flexible, insulating material that can be applied to industrial equipment and products. All types of industrial equipment that require and/or can benefit from an encapsulation of insulation material will benefit from the disclosed invention.

The invention is particularly well suited for deep water exploration activity. The product was designed with all the stringent variables of sub-sea exploration and production applications in mind. The novel compound has thermal insulation characteristics that rival prior art syntactic foam with much greater flexibility characteristics than any deep water insulation material. It is also applied with greater precision with much less labor costs. Due to its greater performance and flexibility it resists compression and water absorption better than most deep water thermal insulation systems. The novel compound will be the preferred insulation system because of its reduced labor costs, ease of field applications and less time needed for insulation of sub-sea equipment and piping projects. With the ease of application and flexibility, it is the ideal insulation material for flexible risers, bulkheads, subsea trees and flexible flowlines and jumper systems that are used in deep water applications. The novel compound, method application and system has greater potential as the offshore oil and gas industry explores and develops deeper and more demanding areas of the world's oceans.

Further, the novel compound, method and system has many other potential markets due to its enhanced characteristics. The Petrochemical and Chemical industry has many applications of insulating the outside diameter of piping systems. Many of the current products are very expensive and labor intensive to apply and repair. Also, many are not flexible and require repairs and reinstallation with the age of the product. Color can also be added to the novel product to identify the welded joints of the pipeline to ease the repair and installation process, and can easily be applied in the field. In addition, the novel product has application potentials in the boat building industry due to its thermal insulation and flexible characteristics. Insulating large refrigerated ships and barges are just one of the applications. Other applications and potentials are certainly possible and will be more readily understood by a reading of the remainder of the application.

SUMMARY OF INVENTION

The present invention provides an insulating material for equipment and a method of applying the material to a length of a tubular member. The equipment, in the most preferred embodiment, is used in water. The insulating formulation is initially prepared as an epoxy component mixture and a curing agent component mixture. The epoxy mixture is a blend of ceramic particles, epoxy and acrylic resins, and various additives; the curing agent mixture is a combination of ceramic particles, curing agents and various additives. Both mixtures were developed with carefully controlled viscosities and volumes so that each mixture is combined at a 1:1 ratio by volume to create the final product. While individual components are necessary to perform basic chemical reactions in the final mixture, the components were also chosen to contribute certain properties to the end-product making the insulating material especially suited for underwater projects.

Cenospheres are hollow aluminosilicate ceramic spheres that are surface treated with an epoxy compatible silane adhesion promoter. Zirox 180 is a zirconium oxide ceramic particulate that increases packing efficiency of the spheres and aids in flow characteristics of the system. Ceramics are naturally good insulators that are provided within the insulating material to prevent heat loss from the equipment to much colder water. The surrounding sea water at near-freezing temperatures can rapidly cool the fluid stream causing impurities to solidify and block the piping system. Such blockage can mean down-time or abandonment of the well-site. The zirconium (which is commerically available under the mark "Zirox 180") also contribute hardness to prevent breakage from the compressive forces in the underwater environment, and resistance to corrosion from the brine and fresh water.

A flexible insulation system can be benefical in many different applications. The binder is the flexible epoxy matrix which holds the insulative particles in place and bonds them to the surface of the part to be insulated. In as such, a variety of materials may be placed in the binder besides the cenosphere and zirconium oxide mix described above.

In particular, it may be undesireable to use hollow particles at extreme water depths. When this is a concern, the process herein described may substitute 10-50 micron PVC (poly vinyl chloride) powder in place of the hollow cenospheres and Zirconium oxide. The resultant insulative mix has a higher thermal conductivity than the cenosphere mix. This is due to the cenosphere being hollow and filled with air. The air is more insulative than the various solid particles that we might substitute. The advantage to using a system with solids only is that you may have less water intrution. When a hollow air filled cenosphere breaks under pressure, the air cavity that is left is more prone to fill with water which is very conductive.

Epon 8132 and Epon 8161 are specially formulated resins. Epon 8132 is a mixture of epoxy resin and $C_{12}$-$C_{13}$ alkyl glycidyl ether (Heloxy 9). Heloxy 9 is derived from epichlorohydrin and an aliphatic $C_{12}$-$C_{13}$ alcohol; its purpose in Epon 8132 is to reduce the viscosity of the resin. Additional Heloxy 9 is added to the formulation of the insulating material to further lower the viscosity. Epon 8161 is an epoxy diacrylate resin that in the formulation reacts with the primary amines of the curing agents. Epon 8161 is also extremely low in viscosity and helps to lower the viscosity of the final formulation. The resins act to encapsulate the ceramic particles and adhere the insulating material to the surface of the coated equipment. The resins further contribute to the hardness of the insulating material helping the insulating material oppose the compressive forces present under water.

Epi-Cure 3164 is a polyamide curing agent for epoxy systems. In the claimed formulation, it acts as a curing agent but it is also the component that provides flexibility to the final insulating material. Once the insulated systems are in place in the underwater environment, the integrity of the systems or any connectivity within the systems will be maintained because flexibility of the insulation will prevent any disruption caused by underwater currents. Usually in the plastics industry, to create a product with a given characteristic, extraneous additives are added to a system to provide a desired characteristic, however, other characteristics due to the additives present inconveniences in the final product. In the claimed formulation, Epi-Cure 3164 was selected as the curing agent because it primarily gave flexibility to the final product. Because of the careful selection of components, the end-product lacks unwanted properties that would detract from the insulation.

Jeffamine D-230 (a polyether polyamine) is another curing agent in the formulation which also helps to lower the viscosity of the mixture. Fiberglass of different strand type and size, pre-treated with epoxy compatible silane additives provides additional reinforcement and prevents cracking of the insulating material when used in systems where flexing exceeds more than the usual 5° flex of steel pipe. For some systems the fiberglass can be omitted from the formulation. Byk 361 is an acrylate silicon flow control agent which contributes to the consistency of the final mixture which is an important feature during the application process. Cab-O-Sil TS-720 is a hydrophobic form of fumed silica also used for consistency and to prevent separation.

As a liquid mixture, the material can be applied in trawlable applications, by extrusion or in geometrical retorts or sprayed onto the surfaces of components that include complex geometries, weld tie ins and patches or repairs if necessary. When the material is applied by spraying, a gelling agent is added to the formulation, it helps the coating hang better for a thicker application. Pipe housed on a reel can be unrolled and after being heated and straightened, can be coated in a heated retort so that a coating of up to three inches of insulating material can be applied to the outer surface of the pipe.

A method of installing an insulated tubular member on the sea floor is also disclosed. The method includes providing a reel of the tubular member and advancing the tubular member from the reel to a first heater member where the tubular member is heated and straightened by a hydraulic cylindrical press. The temperature of the tubular member is monitored and the tubular member may be reheated in a second heater member to a predetermined temperature. Next, the tubular member is advanced to a retort member.

The method further includes applying an insulation compound to the tubular member. In one embodiment, the insulation compound comprises: (a) an epoxy component mixture comprising an epoxy compound, acrylic resins and ceramic particles; and (b) a curing component mixture comprising curing agents, and ceramic particles. The insulation compound, in the most preferred embodiment, will be the insulation composition of matter previously disclosed. The method further includes laying the insulated tubular member on the sea floor.

In one of the embodiments, the step of straightening the tubular member includes passing the tubular member over a series of lasers and determining the tolerance of a section of the tubular member. In turn, a plurality of hydraulic rams is adjusted in order to straighten the tubular member to a predetermined straightness.

In another preferred embodiment, the retort member comprises a first half mold pivotally connected to a second half mold and wherein the step of applying the insulation compound comprises coating the mold halves with a permanent mold release agent, and injecting the insulation compound into the mold halves under pressure. Thereafter, the mold halves are opened and the insulated tubular may be released from the mold halves.

In yet another preferred embodiment, the step of applying the insulation compound comprises measuring a predetermined amount of an epoxy component mixture and a predetermined amount of a curing component mixture. The mixture is then pumped into the retort. This embodiment would include injecting the predetermined amount of epoxy component mixture in a first line connected to the pump and injecting the predetermined amount of curing component in a second line connected to the pump. The first and second line are heated so that the epoxy component mixture and the curing component mixture is heated. The epoxy component and the curing compound are then mixed. The mixture is then pumped into the retort.

The first mold half and the second mold half may contain a plurality of heating bands and the step of applying the insulation compound includes heating the first mold half and the second mold half when the epoxy containing component and the curing component is being injected into the mold halves. Further, in accordance with the teachings of the present invention, after the step of curing the insulation compound, the method may further comprise sensing when the insulation compound has cured and sending a signal to a control panel which in turn will cause advancement of a second section of the tubular member to the retort. It should also be noted that the epoxy containing component and curing agent component mixture must be mixed, at proper ratios, throughly prior to introduction into any mold.

Also disclosed is a system for applying an insulation compound to a tubular member. The system includes a first heater means for heating the tubular member that operates in conjunction with a pipe straightener for straightening the tubular member. Also included is a retort means for containing a section of the tubular member and heating the section of the tubular member.

The system also includes a first vessel containing an epoxy compound, with the first vessel being fluidly connected to a pump means for pumping the epoxy compound to the retort means. A second vessel, which contains a curing agent compound, is also fluidly connected to the pump means. Additionally, a control means, operatively connected to the retort means, for determining the temperature of the mixture within the retort means and generating a signal once a predetermined temperature level is reached is provided. In response to the generated signal, the tubular member is advanced with the advancing means.

In the preferred embodiment of the system, the retort means comprises a first half mold and a second half mold pivotally hinged to the first half mold. The system may also contain laser means for determining the straightness of the tubular member, and producing a signal indicative of the straightness. This embodiment would also include a second heater means, operatively associated with the laser means, for heating the tubular means in response to the laser means signal.

Also disclosed is a method for gluing a first syntactic foam material with a second syntactic foam material with an insulation material. The insulation material includes (a) an epoxy component mixture comprising an epoxy compound, acrylic resins and ceramic particles; and (b) a curing component mixture comprising curing agents, and ceramic particles, with the mixture being at a 1 to 1 volume ratio. The epoxy component mixture contains: (a) an Epon 8132; (b) an Epon 8161 (c) a Heloxy 9; (d) a Byk 36; (e) a Cenospheres; (f) a fiberglass; and (g) a Cab-O-Sil TS-720. The curing component mixture contains: (a) an Epi-Cure 3164; (b) a Jeffamine D-230; (c) a Byk 361; (d) a Zirox180; (e) a Cenospheres; (f) a fiberglass; and (g) a Cab-O-Sil TS-720. This method includes applying the insulation material between the first syntactic foam material and the second syntactic foam material. With this method of use, there is some ability to take movement and would also allow two blocks of rigid syntactic foam to have a buffer between them, much the same as the rubber between two sections of cement on a highway allows for expansion and contraction and prevents the two sections of cement from buckling as in an earthquake when the two plates are forced into one another. This gives the advantage of a flexible syntactic foam as opposed to a rigid system as is currently available.

An advantage of the present system includes that the insulative particles are held together in a novel epoxy binder whose chemistry encapsulates the ceramic particles keeping them in suspension while bonding to the prepared substrate. The binder has been tested in an autoclave at 5,500 pounds of compressive pressure with no degradation.

Another advantage is that the composition keeps the binder system very flexible. Deflections of 45% and greater are achieved. Another advantage is that the system can be applied to jumper, flowlines, tubulars and pipelines that are subject to flexing. Still yet another advantage is that the system and method may be applied by molding into retorts, casting, spraying and extruding into pipe in pipe and geometrically similar retorts. A trawlable version can also be formulated for complex geometries, weld tie ins, and patches or repairs.

Additionally, the material, system and method is applicable to coating pipelines, flowlines, jumper lines, equipment, products, etc. The material can be pumped or poured into non-cylindrical molds built around equipment such as valves, accuators, manifolds, etc. Thus, the coating can be used in the petroleum industry, petrochemical, chemical, ship building, space, utility, etc., literally anywhere that a "flexible" insulation is desired. For instance, it would be possible to insulate the fuel tanks on the space shuttle. The two fuel cells that power the space shuttle are approximately 156 feet tall and 28 feet in diameter. Because of the velocity of the space shuttle on take off, the tanks actually stretch six inches. The standard rigid insulative materials currently available cannot stretch with the tanks and considerable cracking occurs reducing the effectiveness of the insulation. Another advantage of the material is that it has extremely high elongation which allows it to be stretched much further than that of a rigid syntactic foam.

A feature of the present invention includes use of a mixing plant that includes a vessel containing an epoxy containing mixture and a separate vessel containing the curing agent containing mixture. Another feature includes a retort member that receives the epoxy and curing agent mixture. Still yet another feature is the means for injecting the mixture of the two mixtures into the retort.

Another feature is the use of a second retort that can coat a connection between two welded tubular members. Yet another feature includes the control means that will sense, measure and generate a signal representing the temperature of the retort member, and in turn, will advance another section of the tubular member for coating. Still yet another feature is use of a laser means to determine the straightness of the pipe. Another feature is the pump means that will pump the epoxy and the curing agent mixture into the retort at the proper ratios and further function to mix them together.

BRIEF DESCRIPTION OF THE DRAWINGS

FIG. 1 illustrates the steps involved in the coating and insulation of a tubular member unrolled from a reel with the liquid mixture of the insulating material in a preferred embodiment.

FIG. 2 is an overhead view of the retort of FIG. 1 where liquid insulation is applied to coat and insulate the tubular member.

FIG. 3 illustrates a cross-sectional view of the retort member taken from line B-B of FIG. 2.

FIG. 4A illustrates the gap that exist between two welded tubular members from the method represented in FIG. 1.

FIG. 4B illustrates the steps involved in the coating and insulation of a tubular member with use of a second retort for coating a connection of two tubular members that have been connected.

FIG. 4C represents the top view of the retort from FIG. 4B.

FIG. 4D represents the retort of FIG. 4C taken along line C-C of FIG. 4C.

DESCRIPTION OF THE PREFERRED EMBODIMENTS

The insulating material is formulated with components that counter the harsh conditions of industrial applications as well as the underwater environment. Sea water temperatures near 40° F. would draw heat from the equipment or components resulting in contraction, breakage and collapse, and cause solidification of impurities in the fluid stream blocking the piping system. Ceramic particles were selected as a component of the insulating material for its attribute as a good insulator. Two formulations with different densities were tested for thermal conductivity properties. A material with thermal conductivity properties or a high k value would prove the material to be a good conductor whereas a material with a low k value would be a good insulator. Using the claimed formulation as a guide, an insulation was created with a density of 881.3 kg/m³ at a coating thickness of 1.03 inches which when tested at 77° F. proved to have a k value of 0.0955 Btu/hr/ft²/° F. A second insulation with a lower density of 772.8 kg/m³ and a thickness of 1.03 inches had a k value of 0.0867 Btu/hr/ft²/° F. when tested at 78° F. These results suggest that either insulation would act as a good insulator and that hydrates would not form (within a reasonable amount of time) within the insulated systems.

Epoxy was chosen as the matrix to encapsulate the ceramic particles, keeping the particles in suspension, and giving the complete formulation its final consistency and form as the coating. The cured epoxy further acts to tightly adhere the insulating material to the coated surface of the equipment. The cured epoxy was tested in an autoclave with a compressive pressure of up to 5500 pounds and showed no signs of degradation. The particular combination of ceramics in the insulation material is rated for compressive pressures of up to 3500 pounds. Thus, both the epoxy and ceramics in the insulating material contribute hardness to the insulating material to protect equipment under great pressure.

Epi-Cure 3164 was included in the formulation as the curing agent and to introduce flexibility and for its excellent adhesion to the insulating material. Deflection of 45% and greater of the material has been achieved. Flexibility is especially crucial in systems that include flexible risers, subsea trees, jumpers, flexible flowlines and pipelines that can experience flexing due to underwater currents. In combination with the ease of application, the insulating material is ideal for deep water systems.

Epoxy resins as a part of a large group of thermosetting plastics, can be maintained in liquid form at elevated temperatures that cure or cross-link into durable and heat resistant materials. It should be noted that the epoxy mixture may be referred to as component A and the curing agent mixture may be referred to as component B in the application. Components A and B can be prepared and stored separately. The following table provides the ingredients and amounts that make up each of the component mixtures of the claimed formulation.

| COMPONENT A (Epoxy Component Mixture) | | | | |
|---|---|---|---|---|
| | pounds | gallons | % by weight | % by volume |
| Epon 8132 | 92.00 | 10.00 | 11.70 | 9.98 |
| Epon 8161 | 92.00 | 9.58 | 11.70 | 9.56 |
| Heloxy 9 | 35.00 | 4.61 | 4.45 | 4.60 |
| Byk 361 | 3.00 | 0.33 | 0.38 | 0.33 |
| Cenospheres | 150.00 | 25.00 | 19.08 | 24.95 |
| Fiberglass | 12.00 | 0.48 | 1.53 | 0.48 |
| Cab-O-Sil TS 720 | 3.00 | 0.18 | 0.38 | 0.18 |

| COMPONENT B (Curing Component Mixture) | | | | |
|---|---|---|---|---|
| | pounds | gallons | % by weight | % by volume |
| Epi-Cure 3164 | 245.00 | 30.06 | 31.17 | 30.00 |
| Jeffamine D-230 | 15.00 | 1.88 | 1.91 | 1.87 |
| Byk 361 | 3.00 | 0.33 | 0.38 | 0.33 |
| Zirox 180 | 20.00 | 0.42 | 2.54 | 0.42 |
| Cenospheres | 100.00 | 16.67 | 12.72 | 16.63 |
| Fiberglass | 13.00 | 0.52 | 1.65 | 0.52 |
| Cab-O-Sil TS 720 | 3.00 | 0.18 | 0.38 | 0.18 |

The following products are available from Shell Chemical Corporation, Houston, Tex. and are listed under there commercial names: Epon 8132, Epon 8161, Heloxy 9, and Epi-Cure 3164. Byk 361 is a product of Byk Chemie USA Wallingford Conn.; Jeffamine D-230 is a product of Huntsman Chemicals, Houston, Tex.; Cab-O-Sil TS-720 is a product of Cabot Corporation, Tuscola, Ill.; Zirox 180 is produced by Zirconia Sales of Georgia; the cenospheres can be obtained from Fillite Corporation or Sphere Services; and the fiberglass is commercially available from many sources.

In the preferred embodiment, the cenospheres are silane treated. A description of the silane surface treatment process used on the cenospheres of the present invention follows. The purpose of this pretreatment process is to: (1) make the cenospheres a powder material, more easily wetted by the epoxy resin liquids or the curing agent liquids; (2) it results in a lower viscosity mixture, therefore allowing higher loading levels of cenospheres for better insulative properties; and (3) provides better bonding since the silanes are chemically reactive with the epoxy resin or the curing agents. It should be noted that the surface treated cenospheres are still powders. The silane treating process includes blending the cenospheres into a dilute solution of silane surface treating material dissolved in (usually) alcohol. The blend is stirred to insure that the cenospheres are fully wet with the solution. The cenospheres are then filtered out of the solution and then dried back to a powder form and bagged for shipment. The silane treatment used for the cenospheres to be mixed into the epoxy resin blend of the compound has an epoxy chemical functionality. The silane treatment used for the cenospheres to be mixed into the curing agent blend of the compound has an amine chemical functionality. This allows the surface treatment to react chemically with the mixed resin and curing agent system after the two components are mixed without reacting in storage with the liquid in the component into which they are mixed.

Care should be taken to keep the component mixtures A and B and all equipment used in their preparation separate since any contact between the components will initiate curing. Prior to use, the components should be thoroughly mixed. Individual components A and B can be placed in an oven or wrapped with heating bands since applied heat will lower the viscosities of A and B and make each more free flowing for handling.

Components A and B are mixed together at a 1 to 1 ratio by volume and thoroughly mixed until the resultant color is consistent throughout the mixture. Before transferring the mixture to the mold or retort that contains the item to be insulated, the mixture can be further heated to raise the temperature of the mixture to about 115° F.

Heating the mixture, in addition to making the liquid less viscous, will also speed curing since curing is an exothermic reaction and applied artificial heat further contributes to curing. However, the final temperature of the coating mixture should not exceed 300° F. If a final thicker coating of insulating material is required, adjustments need to be made to the amount of heat applied to allow for the added amount of heat due to the exothermic contribution to the final temperature. Curing time can also be shortened by heating the mold, retort or pipe to be insulated by wrapping or applying electric heating coils to the outer surfaces, keeping in mind that the final temperature during curing should not exceed 300° F. Pipe that is to be insulated can be heated to about 275° F.

In readiness, internal surfaces of the mold or retort should be coated with a releasing agent such as poly vinyl alcohol if the insulated item is to be removed from the retort or mold before being used. The liquid mixture should be added to the mold or retort with a riser pipe or other means to be positioned to catch overflow from the mold or retort since the material expands during curing. The mold or retort can be externally sprayed with water to help the releasing agent release the hardened insulation from the inner surface of the mold or retort. Once the mold or retort is removed the hardened portion that was in the riser can be cut away with a knife. A sealer is then applied to the insulation surface to reduce water intrusion which occurs as the compressive pressure increases with water depth. Hydrophobic pigments may be added to the sealer or the sealed surface painted.

The liquid formulation can be pumped into a mold or retort using a plural component pump. In general, the first line A feeds the epoxy component into the manifold of the pump. The second line B feeds the curing agent into the same manifold of the pump. In the preferred embodiment, it is in the pump manifold where the A and B components are mixed. The blend of the A and B components are fed into the retort by one line 38 as shown in FIG. 1 under the pump 36. Thus, the epoxy component and the curing agent component are mixed prior to entering the retort.

In one embodiment, the head of the pump will be left off and the separate flow lines of the pump will be primed. As noted earlier, the coating is a two component system with a one to one ratio. The two components are of different viscosities. When the pump is set up, two hoses feed the plural component pump with the insulative mixture. When beginning the pumping of the two components, the less viscous side (the curing agent) of the insulation composition reaches the pump head first. Out of the head of the pump will be extruded only one half of the two components that make up the insulation. This initial extrusion of material will not cure without the other components that make-up the insulation and so should not be introduced into the mold casing but should be instead pumped into a bucket and later disposed. After the second component begins to extrude, the head is replaced and the two components will now be mixed in the pump head and extruded into the slit in the retort member.

Once the two lines (A and B from FIG. 1) flow steadily, the head of the pump can be replaced and the insulating material pumped into the mold. Pre-heating the separate components and heating the flow lines will ensure lower viscosity and easier handling.

Elements in FIGS. 1, 2, 3, and 4 have been given numerical designations to facilitate an understanding of the claimed method of application of the insulation to the pipe. It should be noted that like numbers appearing in the various figures refer to like components. Referring now to FIG. 1, the steps involved in the coating and insulation of a tubular member unrolled from a reel will now be described. A main control panel 2 receives signal information from various sensors placed within the system which the operator monitors to control and automatically advance the process. The tubular member, whether it is a straight separate piece or taken from a continuous reel of tubing, moves along an assembly line type of system for coating the pipe with the insulating material as will be described in more detail.

Thus, the tubing reel 4 is turned on its central axis and the pipe 6 unrolled from the reel and heated with induction heating coils 7. Because of its previously coiled shape the pipe lifts and pushes upward. A series of pipe straighteners 10 act to mold the pipe into a straighter form, with the pipe straighteners comprising a series of hydraulic ram cylinders 12a, 12b, 12c that presses against the heated pipe which abut the anvils 14 below the pipe. For the hydraulic rams 12a, 12b, 12c to be able to straighten the pipe, there needs to be a stationary anvil 14 so that the pipe can be pressed against to accomplish the straightening. The laser beams 16a, 16b are there to determine at what point the pipe is straight enough to be coated. The laser beam light transmitter 16a is perfectly straight and aligned to a laser receptor 16b at the other end of the pipe. If the pipe is bent, the beam will be broken, much the same as a laser beam functions on a garage door opener. If someone or thing is in the path of the beam, the beam is broken and not received by the laser beam sensor on the other end. In this embodiment, this would indicate that the pipe is bent and would have pressure acted upon it by the hydraulic rams until the pipe were straight enough so as to not break the laser beam. An unbroken laser beam signals the control panel that no additional straightening is required and that the pipe is ready to move down the line to be insulated. A broken laser beam signal is electrically transmitted to the control panel 2 via hard wire 18a in order to automate the straightening process herein described, and with the control panel sending a responsive signal to rams 12a, 12b, 12c via hardwire 18b.

The pipe moves on mechanized rollers 20 to a holding area where a thermocouple or laser pyrometer, schematically depicted as 22 monitors the temperature of the pipe. The representative signal is sent to the control panel 2 via hard wire 24a. If needed, further heat is applied to the pipe by induction heat coils 26 via hard wire 24b.

Heat will make straightening the pipe much easier. The pipe must also be heated to aid in the curing process so that a pipe that is perfectly straight would also be heated at this point prior to entering the mold casing. The reason for heating the pipe to be insulated is that the coating is very insulating and we apply heat only from the outside of the retort casing, the coating will insulate the pipe and keep the heat away from the pipe being insulated which may result in the insulation coating curing unevenly from the outside in. To speed the rate of curing, a combination of external heat sources such as the heating of the pipe, and the heating elements mounted to the retort casing combine with the temperature that occurs naturally when the two components of the insulation system combine (exothermic reaction) thereby reducing the cure time to a matter of minutes.

When the pipe is at the desired temperature and a representative signal is sent to the control panel 2 via hard wire 30, and the control panel 2 further indicates that the retort 28 is empty, the pipe if fed into the retort 28 via the rollers 20 for coating. The retort 28 is also heated by an inductive device 32 such as heating bands wrapped around the outside of the retort 28. The inductive device 32 is also connected to the control panel 2 via hard wire 34 so that the amount of heat supplied to the retort 28 can be automatically monitored and controlled.

The mixing plant 35 feeds a specified amount of heated liquid insulating material composed of components A and B into a plural component pump 36 which delivers it through the topside channel 8 into the pipe-ready retort 40 which will be described in further detail in the discussion of FIG. 2.

Referring again to FIG. 1, when the insulation material has cured about the tubular member, the control panel 2 by way of the hydraulic cylinders 42 opens the retort 28. The automated rollers 44 move the coated section of pipe out of the retort 28 while another section moves into the retort for coating. The coating process continues until the desired length of pipe is coated and the final coated pipe can be re-rolled around a large reel.

According to the teachings of this invention, when cured to the point of being able to encapsulate another section of pipe, the control panel 2 will send a signal to operate the hydraulic rams to open the clam shell mold. The control panel 2 then sends a signal to the automated roller that the section of pipe just coated needs to be sent to the next station and that another section of pipe is ready to enter the retort to be insulated. As the insulated pipe moves to the next station, the pipe is welded to the previous section of pipe. When complete, the pipe travels to the next station where the second mold clamps down on the outside of the two pipes that have just been welded. The one foot section where the welding has taken place is ready to be insulated. The second clam shell mold is closed by the hydraulic cylinders and feed line from the mixing plant administers a smaller amount of the novel coating required to fill the one foot length. This smaller retort is also equipped with heating bands. The pipe may be hot enough from the welding of the joint so as not to require additional heating of the pipe.

As seen in FIGS. 2 and 3, the design of the retort 28 is similar to a bi-valve clam shell. The retort (sometimes also referred to as a mold) is essentially a piece of solid casing that varies in length according to the piece of pipe to insulated. The mold is manufactured a foot shorter than the tubular to be insulated. Generally, the sections of pipe are arranged in forty foot intervals and will be welded to another forty foot section of tubular. When making the mold casing one foot shorter than the pipe to be insulated, the result is that it leaves a six inch section on each end of the tubular to allow the next joint to be welded to it. This creates a one foot gap between two pieces of the tubular that will be without insulation.

The retort mold casing starts out as a standard piece of casing that is cylindrical and without any holds or splits. The first machine action on the mold is to mill a slot approximately one inch wide beginning six inches from one end of the casing and continuing the length of the casing but stopping at six inches from the other end. With a thirty nine foot length, the milled slit in the casing would begin six inches from one end of the casing and continues until it ends 38 feet later at six inches from the end. This is the slit through which the coating will be poured into the mold. Inside the mold will be the actual pipe that the insulation will be coating. The insulation will bond to the pipe to be coated. The mold casing will be coated with a releasing agent or a material that will allow the insulative coating to release from the mold casing allowing the mold to be reused for each piece of pipe to be coated.

After the mold casing has been milled, the mold casing is then split in two, lengthways creating two halves thirty nine feet long. The mold casing is then hinged 41 at the bottom to connect the two halves and to give them the mechanical ability to be opened and closed to allow the pipe to be placed into position within the mold casing to allow for coating. As seen in FIG. 3, the hydraulic rams 42 are mounted to the sides of each mold half and when operated open the mold in a clam shell fashion creating a large opening to release the pipe. The next piece of pipe enters the mold casing and the hydraulic rams 42 close the mold casing enclosing the pipe to be insulated and the milled slit is ready to accept more insulation. This process continues for each pipe to be insulated.

The retort 28 is made up of two hinged halves 28a, 28b that open lengthwise with the hinge 41 on the bottom of the retort. Hydraulic cylinders control the opening and closing of the retort on the bottom hinge. The retort is made of cast iron or ceramic material and the inner surface is permanently coated with a releasing agent to aid in release of the coated pipe. An elongated channel 8 milled into the top of the retort (which was also seen in FIG. 2) allows addition of the liquid insulation material to the retort 28 that will fill the interior and surround the pipe. On the end of the retort where the pipe section enters, the mold is closed around the pipe by an endcap 43. The end cap 43 may be like a washer wherein the center opening fits over the pipe to be insulated—the inner diameter of the retort holding the outer diameter of the end cap. On the other end where the pipe section will exit, the mold is open and slightly oversized with reference to the outer diameter. If the pipe is not to be continuously coated, two endcaps are placed on both ends of the retort.

FIG. 4A illustrates the gap that exist between two welded tubular members from the method represented in FIG. 1. In a second embodiment depicted in FIG. 4B, two joints of pipe require connection together such as by welding. A second retort or mold casing 44 is shown in this figure which will accomplish the insulating of the one foot long section of insulation that is created in the middle of every two joints that are welded together. More particularly, when coating the forty foot single joint of pipe, six inches of the pipe is uninsulated as stated earlier. This allows the individual joints of pipe to be welded together, one after another, which in turn makes a continuous string of pipe that will make up the pipeline, for instance. Second retort 44 is similar in design as the retort 28 previously described. FIG. 4C represents the top view of the retort from FIG. 4B. FIG. 4D represents the retort of FIG. 4C taken along line C-C of FIG. 4C.

By leaving the final six inches of each piece of pipe uncoated, there is now a one foot gap that needs to be insulated. The second mold described in this FIG. 4B is a smaller version of the casing mold described in FIGS. 2 and 3 since the length of the second mold needs only be one foot long to accomplish the insulation of the one foot gap that exists between the welded joints of the two pieces of pipe. The second mold has the end inside diameter machined slightly oversize so that it fits on the outside insulated diameter of the two welded joints of pipe. The second mold insulates only the center of the two pipes joined by welding. This process continues and is done so on a continuous length and then coiled onto a pipe reel which may be miles long until the reel is full in which case an empty reel is positioned into place and the process begins again. The welding of the beginning of the second reel to the end of the first reel makes for a continuous pipeline of many miles.

Changes and modifications in the specifically described embodiments can be carried out without departing from the scope of the invention which is intended to be limited only the proper scope of the claims, and any equivalents thereof.

We claim:

1. An material comprising a cured epoxy comprising an epoxy component mixture and a curing component mixture, wherein
   a) the epoxy component mixture comprises an epoxy resin blended with an alkyl glycidyl ether, an epoxy diacrylate resin, and ceramic particles; and
   b) the curing component mixture comprises a polyamide curing agent, a polyether polyamine curing agent, and ceramic particles.

2. The material as recited in claim 1, wherein said epoxy component mixture comprises:
   a) an epoxy resin comprising a diglycidyl ether of bisphenol-A mixed with a $C_{12}$-$C_{13}$ alkyl glycidyl ether,
   b) an epoxy diacrylate resin,
   c) a $C_{12}$-$C_{13}$ alkyl glycidyl ether;
   d) an acrylic resin;
   e) a silane treated cenosphere;
   f) a fiberglass; and
   g) hydrophobic fumed silica.

3. The material of claim 1, wherein the epoxy component mixture comprises: (a) an epoxy resin; (b) an epoxy diacrylate resin; (c) a $C_{12}$-$C_{13}$ alkyl glycidyl ether; (d) an acrylated silicon flow control agent; (e) a silane treated cenosphere; (f) fiberglass pre-treated with epoxy silane; and (g) fumed silica.

4. The material of claim 1, wherein the curing component mixture comprises: (a) a polyamide curing agent for epoxy system; (b) a polyether polyamine curing agent; (c) an acrylated silicon flow control agent; (d) a zirconium oxide ceramic particulate; (e) a silane treated cenosphere; (f) fiberglass pre-treated with epoxy silane; and (g) fumed silica.

5. The material of claim 1, wherein a 1.03 inch thick sample of the material has an insulation k value of about 0.08 Btu/hr/ft$^2$/° or greater, at 78° F.

6. The material of claim 1, wherein the cured epoxy is free of visible degradation at compressive pressure of 5500 pounds.

7. The material of claim 1, wherein the epoxy component mixture and the curing component mixture are present in a ratio of about 1 to 1.

8. The composition of claim 1 as an insulation material glued between first and second syntactic foam materials.

9. The material of claim 8, wherein the epoxy component mixture and the curing component mixture are present in a ratio of 1 to 1.

10. The material of claim 8, wherein the ceramic particles are hollow aluminosilicate ceramic particles.

11. The material of claim 8, wherein the ceramic particles have a silane surface treatment.

12. The material of claim 11, wherein the silane surface treatment of the ceramic particles in the epoxy component mixture includes an epoxy chemical functionality; and the silane surface treatment of the ceramic particles in the curing component mixture includes an amine functionality.

13. The material of claim 8, comprising zirconium oxide ceramic particles.

14. The material of claim 8, wherein the epoxy component mixture comprises: (a) a mixture of epoxy resin and an alkyl glycidyl ether; (b) an epoxy diacrylate resin reactive with a primary amine; (c) a $C_{12}$-$C_{13}$ alkyl glycidyl ether; (d) an acrylated silicon flow control agent; (e) a silane treated cenosphere; (f) fiberglass pre-treated with epoxy silane; and (g) fumed silica.

15. The material of claim 8, wherein said epoxy component mixture comprises:
   a) an epoxy resin comprising a diglycidyl ether of bisphenol-A mixed with an alkyl glycidyl ether;
   (b) and epoxy diacrylate resin
   c) a silane-treated cenosphere;
   d) fiberglass; and
   e) hydrophobic fumed silica.

16. The material of claim 8, wherein the curing component mixture comprises: (a) a polyamide curing agent; (b) a polyether polyamine curing agent; (c) an acrylated silicon flow control agent; (d) a zirconium oxide ceramic particulate; (e) a silane treated cenosphere; (f) fiberglass pre-treated with epoxy silane; and (g) fumed silica.

* * * * *